US011366734B2

(12) United States Patent
Xia (10) Patent No.: US 11,366,734 B2
(45) Date of Patent: Jun. 21, 2022

(54) IDENTIFICATION OF LOG EVENTS FOR COMPUTING SYSTEMS

(71) Applicant: Citrix Systems, Inc., Fort Lauderdale, FL (US)

(72) Inventor: Sharine Xia, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/934,418

(22) Filed: Jul. 21, 2020

(65) Prior Publication Data
US 2021/0334188 A1 Oct. 28, 2021

Related U.S. Application Data

(63) Continuation of application No. PCT/CN2020/086404, filed on Apr. 23, 2020.

(51) Int. Cl.
*G06F 11/00* (2006.01)
*G06F 11/30* (2006.01)
*G06F 11/32* (2006.01)
*G06F 11/07* (2006.01)

(52) U.S. Cl.
CPC ........ *G06F 11/3075* (2013.01); *G06F 11/076* (2013.01); *G06F 11/0787* (2013.01); *G06F 11/3006* (2013.01); *G06F 11/324* (2013.01)

(58) Field of Classification Search
CPC ............... G06F 11/079; G06F 11/0778; G06F 11/0769; G06F 11/0793; G06F 11/0787; G06F 11/3636
See application file for complete search history.

(56) References Cited

U.S. PATENT DOCUMENTS

| 8,997,176 B1* | 3/2015 | Znidarsic | H04L 63/20 726/1 |
| 2009/0089252 A1* | 4/2009 | Galitsky | G06F 16/245 |
| 2016/0065884 A1* | 3/2016 | Di Censo | G06F 3/005 386/227 |
| 2017/0063762 A1* | 3/2017 | Machol | H04L 51/36 |

OTHER PUBLICATIONS

Manning, Introduction to information Retrieval, 2009, Cambridge University Press, 32-35 (Year: 2009).*

* cited by examiner

*Primary Examiner* — Charles Ehne
(74) *Attorney, Agent, or Firm* — Banner & Witcoff, Ltd.

(57) ABSTRACT

Aspects of the disclosure relate to various systems and techniques that provide methods and systems for identifying log event for computing systems. For example, receiving a log event of an application and identifying at least one key word and determining a number of instances in which the computing device has received the log event based on the at least one key word. Further, determining a value for the leg event based on the determined number of instances where the value is representative of an inverse relationship between the number of instances of receipt of the log event and a criticality of that log event and initiating an action to address the event indicated by the log event based on a comparison between the determined value and a threshold.

20 Claims, 8 Drawing Sheets

| Log Events | Criticality | Normalized Criticality |
|---|---|---|
| 2017/12/11 16:44:53 Hypervisorconnection[#1:289cbddb-19ff-489e-b4cb-5ca37a54ad98]:markpoweractionfailed(power...vda-1.admin.restrart]) reason: failure in restart, vm_bad_power_state, opaqueref:cdbdbf1d-f1f6-2e7a-55df-3c4b358e8912, running, halted | 1.64 | 1.0 |
| expensivecache - updatehostlistandmetrics:system.invalidoperationexception: connection terminating at citrix.poolmanagement.vmmanager.vmmimpl...(func'2 xenservercommanddelegate) at citrix.poolmanagement.vmmanager.vmmimpl... | 1.18 | 0.72 |
| 2018/ 01/30 16:35:07 xhcdi-ddc-1 ####getgracelicense: szlicenseprofile <xdt_plt_ud#a.u#user0@bvt.d#72884c48:xhc ... cli-1> | 0.40 | 0.24 |
| groomapplicationerrors executed successfully | 0.38 | 0.23 |
| 2018/ 01/ 19 19:06:28 ####getgracelicense: szmfprodnameandfeat <xdt_pl&mps_plt> | 0.31 | 0.19 |

IDENTIFICATION OF LOG EVENTS FOR COMPUTING SYSTEMS

CROSS-REFERENCE TO RELATED APPLICATIONS

This application is a continuation of and claims priority to co-pending PCT application serial number PCT/CN20/86404, filed Apr. 23, 2020, entitled "Identification of Log Events for Computing Systems," the contents of which are hereby incorporated by reference in their entirety.

FIELD

Aspects described herein generally relate to computer hardware and software. In particular, one or more aspects of the disclosure generally relate to the identification of log events for computing systems generally, and in particular software applications.

BACKGROUND

An internet based computing environment can include access to remote meetings, the sharing of information, and access to remote applications that may include software as a service and other internet based applications. Such applications allow users to access various types of resources, such as desktops and applications, which are hosted on a remote server, but presented as if they were local resources. Many applications and resources utilize event logs to document events or occurrences encountered within the application or resource.

SUMMARY

Software engineers may use event logs to isolate problems and/or monitor an application's performance. However, some applications may produce thousands of entries every minute, making the ability to find or isolate certain events difficult.

Aspects of the disclosure relate to various systems and techniques that provide for a method and apparatus that determine log events (e.g., critical log events) through the use of natural language processing (NLP) and machine learning. For example, NLP may be used to review log events to identify key words, and eliminate non-essential words. NLP may utilize techniques such as the removal of stop words, stemming and lemmatizing to identify the key words within an event record. As log events are reviewed, they are compared to previous log events to determine if there is enough of a similarity to treat both log events as the same. If so, the events are combined, thus reducing the overall number of log events being stored in an event dictionary. Typically, the majority of similar, repeated log events are not critical, an inverse document frequency analysis may be applied to the log events in the event dictionary to identify those events that have occurred the least. The events may also be ranked for criticality, based on a key word analysis, to identify the most critical log events.

At least one aspect of this disclosure is directed to a method that includes receiving, by a computing device, a log event of an application, where the log event includes at least one key word. The computing device determines a number of instances in which the computing device has received the log event based on the at least one key word. The computing device then determines a value for the log event based on the determined number of instances where the value is representative of an inverse relationship between the determined number of instances of the log event and a criticality of that log event. The method includes initiating, by the computing device, an action to address an event indicated by the log event based on a comparison between the determined value and a threshold.

In other aspects, the method may be embodied in computer-readable instructions or executed by a data processing system.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards the determination of log events (e.g., critical log events). Log events from applications and resources are received, filtered by similarity, where they are ranked by criticality and stored in a database, (e.g., an event dictionary).

Event logs enable problems or errors in software and/or hardware to be identified, isolated and/or monitored to ensure application performance. However, some applications and/or devices may produce thousands of entries every minute, making the ability to find or isolate certain events difficult. As more applications are designed to execute on cloud resources, these applications can generate thousands of log events every minute. The majority of these log events may not be critical and may simply be informational. However, there may also be some critical log events that need attention. Identification of these critical log events may be elusive as a software engineer may not know what to search for, or the key words associated with an event of interest.

The current disclosure is directed to identifying log events by first eliminating unnecessary words within log events. Filler words, identifiers, stop words, etc., are removed from the log events. The remaining words (e.g., key words) are stored within a database where the importance of each word is determined, based on an inverse frequency of occurrence of the word. The log events are then compared to each other, based on the key words contained within a particular log event, to identify if two or more log events are similar enough to combine into a single log event. The log events are then ranked in importance, based on an inverse frequency basis, where the fewer times a log event occurs, the more importance (e.g., criticality) it is given. In this manner the critical log events may be identified.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Figure 1:
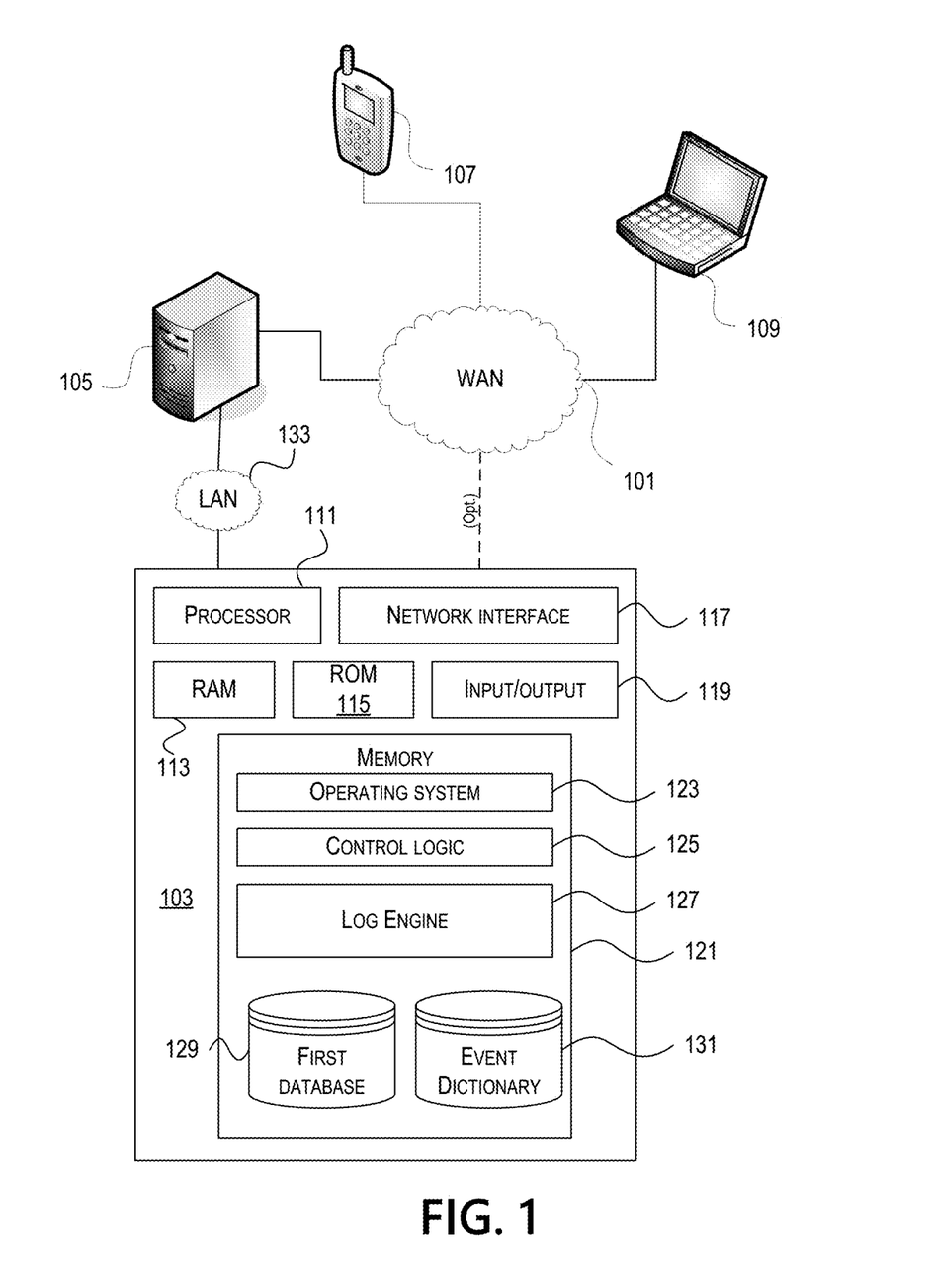
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture 100 that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Wide area network 101 is for illustration purposes and may be replaced with fewer or additional computer networks. A local area network 133 may have one or more of any known LAN topologies and may use one or more of a variety of different protocols, such as Ethernet. Devices on nodes 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device, such as data server 103, control logic 125 for instructing data server 103 to perform aspects described herein, and other application software, such as log engine 127 providing other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and an event dictionary 131. In some embodiments, the first database 129 may include the event dictionary 131 (e.g., as a separate table, report, etc.). That is, the information can be stored in a single database, or separated into different logical, virtual, or physical databases, depending on system design. Devices 105, 107, and 109 may have similar or different architecture as described with respect to data server 103. Those of skill in the art will appreciate that the functionality of data server 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware, or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
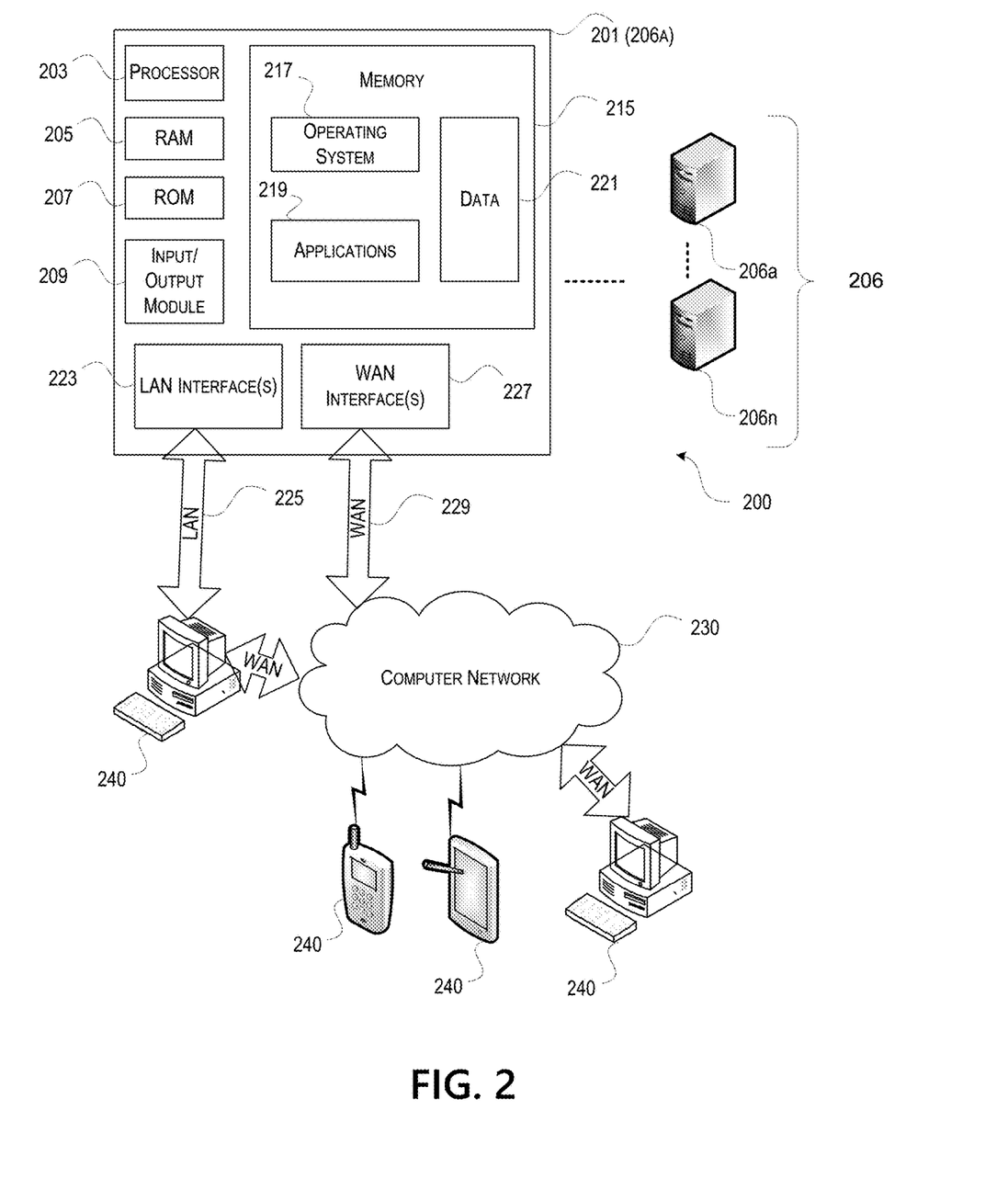
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, such as an automatic logging system, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device data server 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window, or in the case of audio output, where such audio would be output via a speaker or audio output jack. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., wide area network 101.

Figure 3:
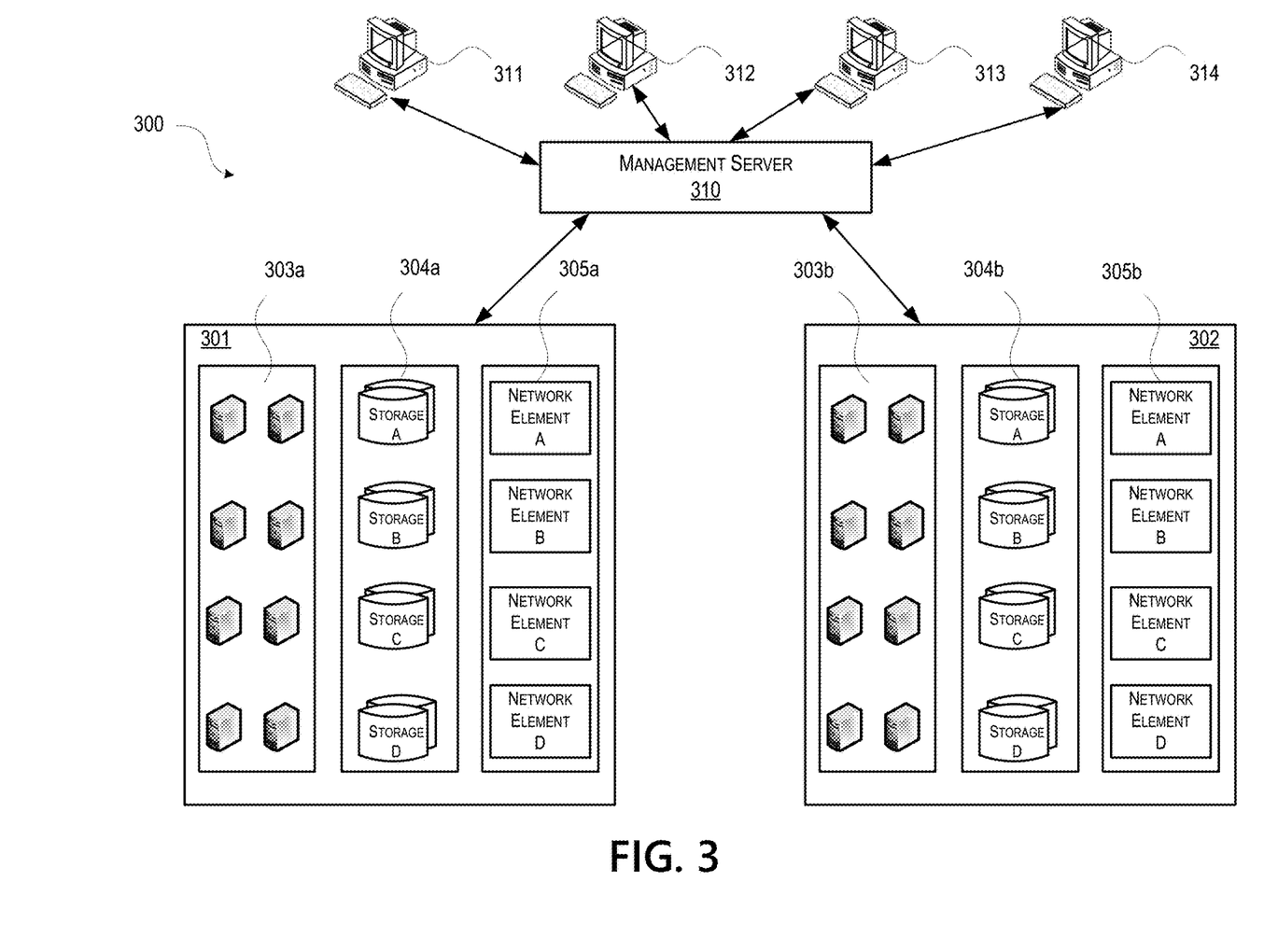
FIG. 3 depicts an illustrative cloud-based system architecture that may be used for automated application launching and in accordance with one or more illustrative aspects described herein.

With reference to FIG. 3, some aspects described herein may be implemented in a cloud-based environment. FIG. 3 illustrates an example of a cloud computing environment (or cloud system) 300. As seen in FIG. 3, client computers 311-314 may communicate with a cloud management server 310 to access the computing resources (e.g., host servers 303a-303b (generally referred herein as "host servers 303"), storage resources 304a-304b (generally referred herein as "storage resources 304"), and network elements 305a-305b (generally referred herein as "network resources 305")) of the cloud system.

Management server 310 may be implemented on one or more physical servers. The management server 310 may run, for example, Citrix Cloud by Citrix Systems, Inc. of Ft. Lauderdale, Fla., or OPENSTACK, among others. Management server 310 may manage various computing resources, including cloud hardware and software resources, for example, host computers 303, data storage devices 304, and networking devices 305. The cloud hardware and software resources may include private and/or public components. For example, a cloud may be configured as a private cloud to be used by one or more particular customers or client computers 311-314 and/or over a private network. In other embodiments, public clouds or hybrid public-private clouds may be used by other customers over an open or hybrid networks.

Management server 310 may be configured to provide user interfaces through which cloud operators and cloud customers may interact with the cloud system 300. For example, the management server 310 may provide a set of application programming interfaces (APIs) and/or one or more cloud operator console applications (e.g., web-based, or standalone applications) with user interfaces to allow cloud operators to manage the cloud resources, configure the virtualization layer, manage customer accounts, and perform other cloud administration tasks. The management server 310 also may include a set of APIs and/or one or more customer console applications with user interfaces configured to receive cloud computing requests from end users via client computers 311-314, for example, requests to create, modify, or destroy virtual machines within the cloud. Client computers 311-314 may connect to management server 310 via the Internet or some other communication network, and may request access to one or more of the computing resources managed by management server 310. In response to client requests, the management server 310 may include a resource manager configured to select and provision physical resources in the hardware layer of the cloud system based on the client requests. For example, the management server 310 and additional components of the cloud system may be configured to provision, create, and manage virtual machines and their operating environments (e.g., hypervisors, storage resources, services offered by the network elements, etc.) for customers at client computers 311-314, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 311-314 may be related, for example, to different client computers creating virtual machines on behalf of the same end user, or different users affiliated with the same company or organization. In other examples, certain clients 311-314 may be unrelated, such as users affiliated with different companies or organizations. For unrelated clients, information on the virtual machines or storage of any one user may be hidden from other users.

Referring now to the physical hardware layer of a cloud computing environment, availability zones 301-302 (or zones) may refer to a collocated set of physical computing resources. Zones may be geographically separated from other zones in the overall cloud of computing resources. For example, zone 301 may be a first cloud datacenter located in California, and zone 302 may be a second cloud datacenter located in Florida. Management server 310 may be located at one of the availability zones, or at a separate location. Each zone may include an internal network that interfaces with devices that are outside of the zone, such as the management server 310, through a gateway. End users of the cloud (e.g., clients 311-314) might or might not be aware of the distinctions between zones. For example, an end user may request the creation of a virtual machine having a specified amount of memory, processing power, and network capabilities. The management server 310 may respond to the user's request and may allocate the resources to create the virtual machine without the user knowing whether the virtual machine was created using resources from zone 301 or zone 302. In other examples, the cloud system may allow end users to request that virtual machines (or other cloud resources) are allocated in a specific zone or on specific resources 303-305 within a zone.

In this example, each zone 301-302 may include an arrangement of various physical hardware components (or computing resources) 303-305, for example, physical hosting resources (or processing resources), physical network resources, physical storage resources, switches, and additional hardware resources that may be used to provide cloud computing services to customers. The physical hosting resources in a cloud zone 301-302 may include one or more computer servers 303, such as the virtualization servers 301 described above, which may be configured to create and host virtual machine instances. The physical network resources in a cloud zone 301 or 302 may include one or more network elements 305 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 301-302 may include storage disks (e.g., solid state drives (SSDs), magnetic hard disks, etc.) and other storage devices.

The example cloud computing environment shown in FIG. 3 also may include a virtualization layer with additional hardware and/or software resources configured to create and manage virtual machines and provide other services to customers using the physical resources in the cloud. The virtualization layer may include hypervisors, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 303 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Figure 4:
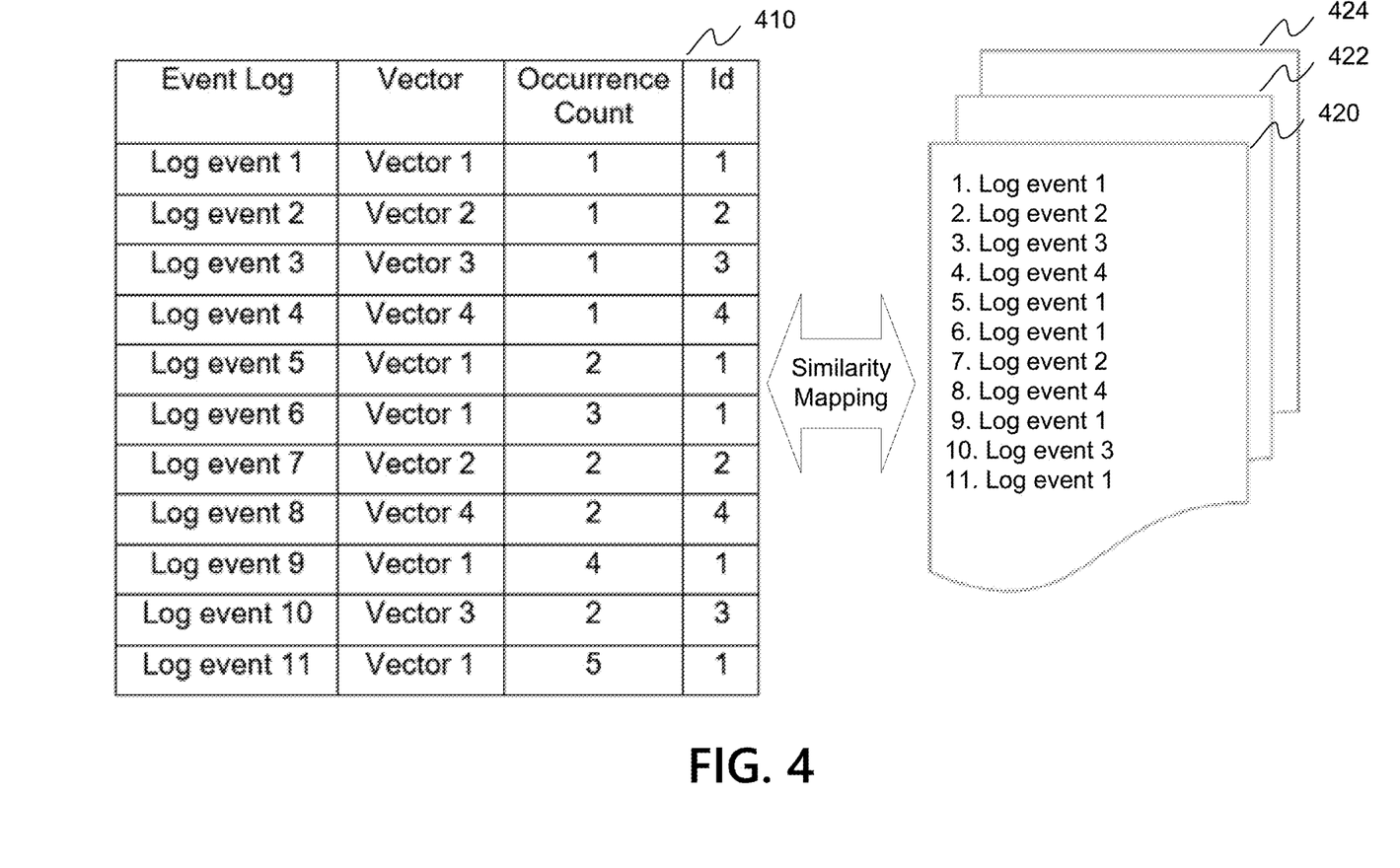
FIG. 4 depicts an example event log with similarity mapping in accordance with one or more illustrative aspects described herein.

FIG. 4 depicts an event log similarity mapping process that may include a log event dictionary 410 and multiple log files 420, 422 and 424. One or more applications or portions of applications may execute on one or more computing devices, e.g., on one or more portions of the computing environment 200, and/or on the nodes 103, 105, 107, and 109. Applications may be configured to log event data for one or more users. The applications may also be configured to log event data themselves (e.g., in log files stored by the applications themselves), and/or may be caused to log event data by a different application (e.g., a tracking application, which may monitor the activity of other applications and may log event data based on the activity).

The log files 420, 422, and 424 may be any information relating to use, by one or more users, of the applications, computing programs, or the like. The log files 420, 422, and 424 may be recorded in one or more log files by the applications. Additionally and/or alternatively, the log files 420, 422, and 424 may relate to a first application, a second application, and a third application, respectively, may be collected by one or more different applications (e.g., a remote access application, an application monitoring service, operating system logs). The log files 420, 422, and 424 may comprise one or more indications of use of the applications for a single user and/or a plurality of users. The log files 420, 422, and 424 may indicate information such as a user of one or more applications, an event action taken with respect to the one or more applications, an application failure, one or more locations (e.g., on a network, in an office, in the United States) associated with the event action, a result of the event action, and the like. For example, the log files 420, 422, and 424 may indicate that a user logged into a specific application in their office at a particular time or that there was a database exception error in an application at a specific time.

The log files 420, 422, and 424 may contain event records, for example log entries 1 through 11 shown in log file 420, that may contain identical, or highly similar events. The log event dictionary 410 illustrates how similar log event records may be grouped. For example, assume log event data 420 is the first set of log data to be received. The first record, "Log event 1" may be used to start the building of the log event dictionary 410 and is entered as "Log event 1" with an associated "Vector 1" and "Occurrence Count" of 1 and an identifier "ID" of 1. The "vector," as will be explained in detail later, may comprise a set of values (referred to as the inverse document frequency word values) of the identified key words contained in the log event dictionary 410. The key words and their associated inverse document frequency values may be used to characterize the contents of individual log events. The vectors may also be used to determine if the similarity of log events is sufficiently the same to eliminate the need to store multiple similar log events. For example, if two log events both referred to events using 95% of the same key words, it is likely that the events are not unique and thus do not have to be treated separately. This approach reduces the number of event "types" allowing to identify those log events that are different from the other log events.

Log events 2, 3, and 4, in this example, may be treated in a similar fashion to the first log event in the sense that the log event may be determined to be different from the preceding log events in the log event dictionary 410. Thus, at this point, the log event dictionary 410 may consist of log events 1 through 4, each with an occurrence count of 1. An occurrence count may be used to identify the number of times a log event describing a particular event is identified. However, the fifth log event, "Log event 1" may be highly similar, or identical to "Log event 1" with as both log events are described by "Vector 1." Since log event 5 in the log event dictionary 410 shows the same vector, i.e., vector 1, rather than making a new entry for log event 5, the occurrence count of vector 1 may be incremented by 1 to the value of 2, signifying that log event 5 is the second occurrence of a log event with vector 1 values.

Continuing with the example, by processing log events 6 through 11, the resulting log event dictionary 410 may indicate 5 log events that match vector 1 (e.g., log events 1, 5, 6, 9, and 1), 2 log events that match vector 2 (e.g., log events 2 and 7), 2 log events that match vector 3 (e.g., log events 3 and 10), and 2 log events that match vector 4 (e.g., log events 4 and 8).

Figure 5:
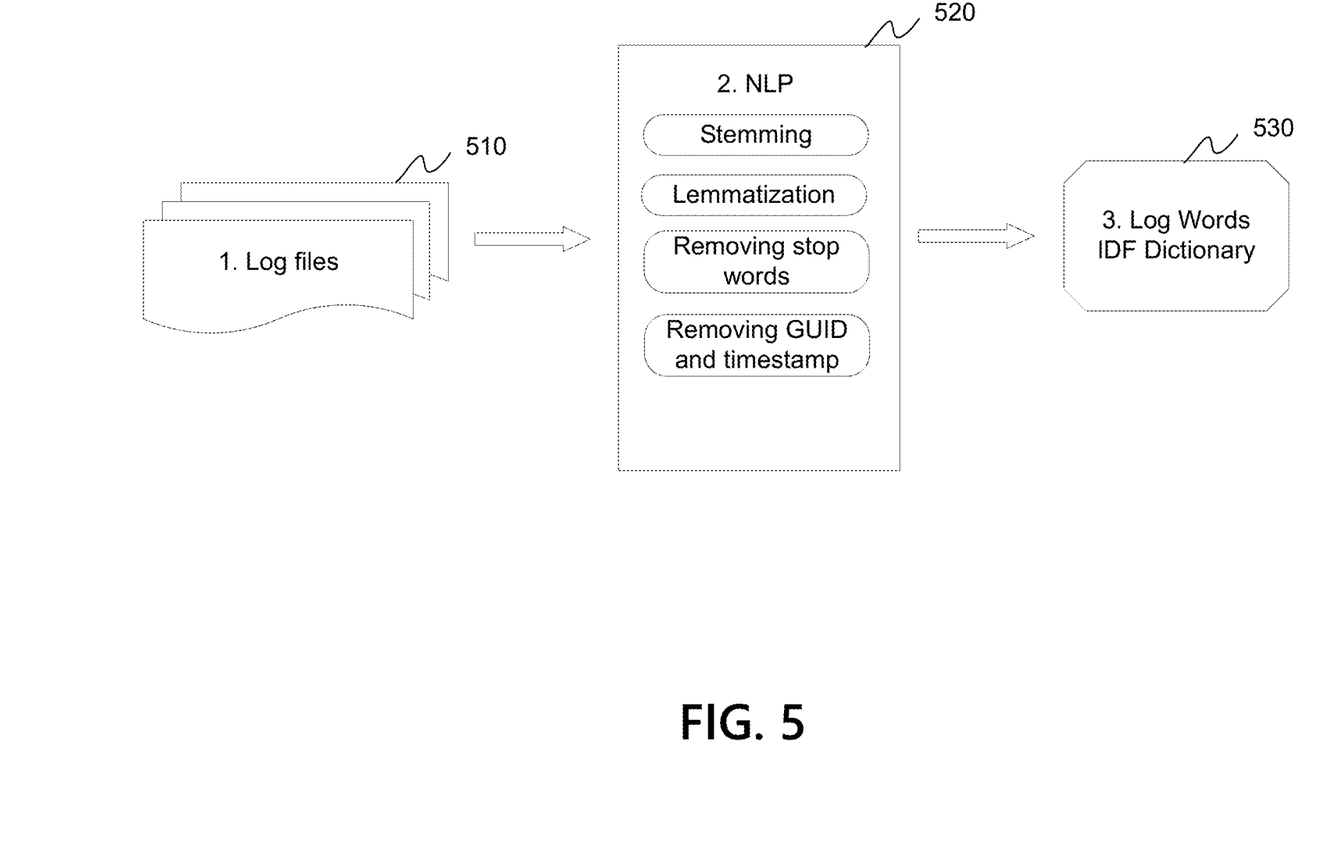
FIG. 5 depicts an illustrative example of building an inverse document frequency dictionary in accordance with one or more illustrative aspects described herein.

FIG. 5 illustrates a process of building a word dictionary comprising key words identifiable or otherwise associated with inverse document frequency values. The process may start with a set of domain log files 510, where the domain log files 510 may originate from multiple sources, and/or alternatively from a single source over multiple time periods. Different domains may represent different product threads, services, and companies or organizations. Different domains may also result in the creation of different word dictionaries.

Individual domain log files within the set of domain log files 510 may contain one or more log events, for example, as described in FIG. 5. The log events in the domain log files 510 may be processed, batched, or otherwise segregated through a filtering process, for example, through the use of natural language processing 520. The natural language processing 520 may be directed to remove non-essential words within any of the domain log files 510 so as to have key words remaining with an inverse document frequency (IDF) value representing an importance of that key word. Non-essential words, for example, are not directed to the subject matter of a domain log file and may be considered fill, such as "the", "at", "file #", "log:", "has", "name", "id", "label", etc. Thus, the use of natural language processing 520 is directed to reducing the quantity of non-essential words stored within a word dictionary, such as a log words IDF dictionary 530.

The natural language processing 520 may filter or otherwise sort words contained within the domain log files 510 through the use of processing techniques, for example, stemming, lemmatization, the removal of stop words, and the removing of guides and timestamps. For example, stemming may be used to reduce inflected words to their word stem, base, or root form. For example, the stem word "cat" may identify words such as cats, catlike, and catty. A stemming techniques may also reduce words such as fishing, fished, and fisher to the stem word "fish." Thus, the natural language processing 520 may filter multiple words in the domain log file 510 to a single stem word and thereby conserving processing resources.

In a similar manner, the use of lemmatization may also be used by the natural language processing 520. Lemmatization is a process of grouping together inflected forms of a word to be analyzed as a single item. Lemmatization may be used to determine the lemma (e.g., in linguistics, a word that stands at the head of a definition in a dictionary—the "base" word) of a word based on its intended meaning. Thus, lemmatization may depend on correctly identifying the intended part of speech and meaning of a word in view of its context. Stemming may operate on a single word without consideration of context. For example, the word "better" may identify "good" as its lemma based on a dictionary meaning of the word.

The natural language processing 520 may also filter words within the domain log files 510 by the removal of stop words. Stop words, in computing, may be referred to mean the most common words in a language. While there may not be any universal list of stop words, any group of words may be identified for a given purpose. For example, short function words such as "the", "is", "at", "which", and "on" in the English language may be identified as stop words. For example, Internet search engines typically ignore stop words during a search.

The natural language processing 520 may also filter words within the domain log files 510 by the removal of identifiers not directed to subject matter of a log event. For example, timestamps and file identifiers such as a globally unique identifier, e.g., a GUID. After filtering the domain log files 510 to remove non-essential words, the remaining words may be referred to as key words, where individual key words are assigned a value, which may be referred to as an inverse document frequency (IDF) value. This process may also be labeled as key word extraction.

Figure 6:
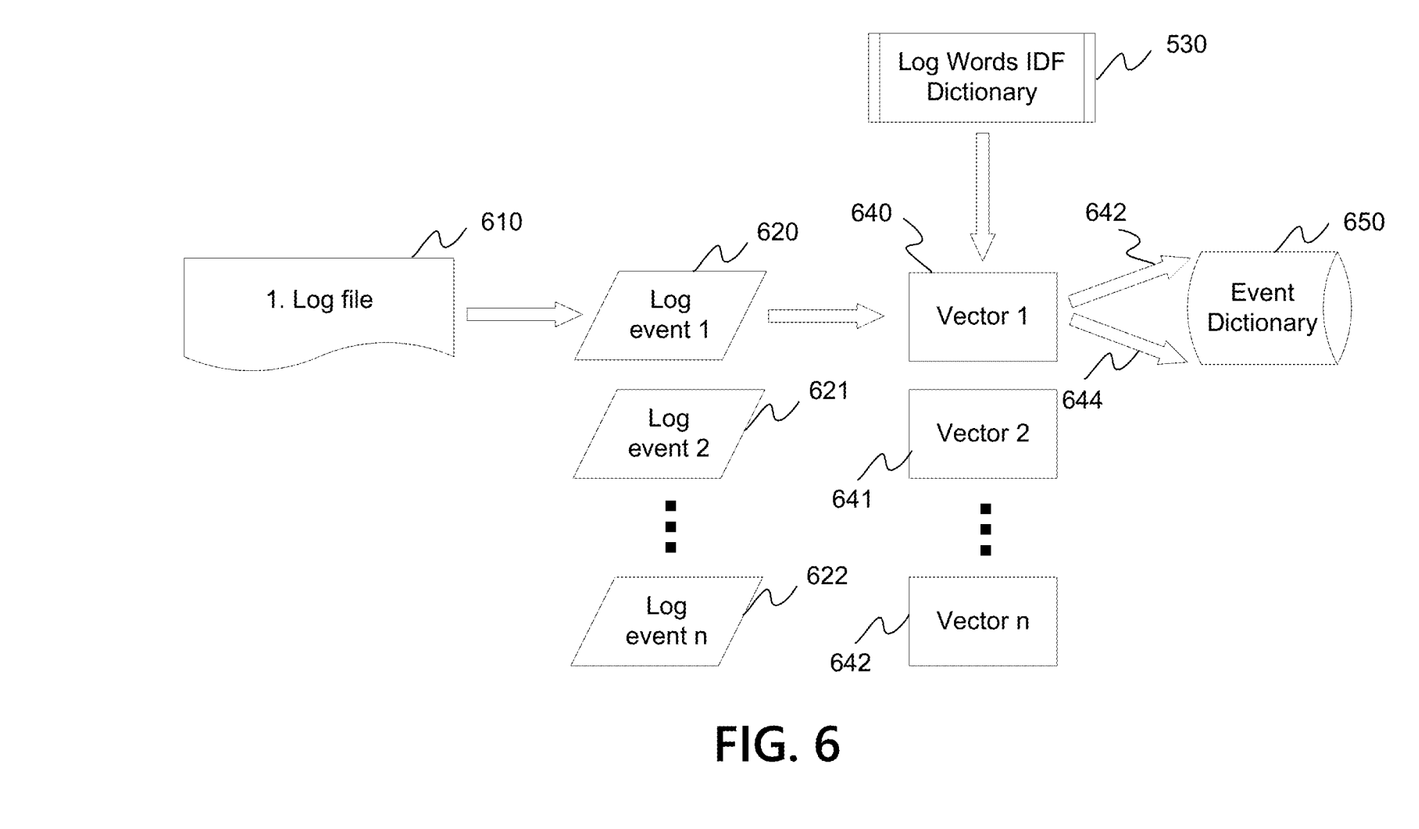
FIG. 6 depicts an illustrative example of building an event dictionary in accordance with one or more illustrative aspects described herein.

The IDF value for a key word within the log words IDF dictionary 530 may be calculated using the following formula:

$$idf_i = \log(\beta D|/|\{j:t_i \in d_j\}|)$$

where:
$idf_i$=IDF value of key word i
$|D|$=total number of log events
j=index of any log event that contains the word $t_i$
$t_i$=word with index i
$d_k$=log event with index j FIG. 6 shows a process of building an event dictionary from a log file. A log file 610 may contain one or more log events, or log entries. As discussed, a log event may be any information relating to the use or execution of a software application including any resources involved or associated with the software application. Log events, as shown at 620 by log event 1, at 621 by log event 2, through 622 at log event n, may be analyzed to extract one or more key words to produce the log words IDF dictionary 530 as discussed in FIG. 6. Vectors 640, 641, and 642 are then generated, one vector for individual log events based on the IDF values of the log words IDF dictionary 530 contained in each log event, where n is the total number of log events. For example, log event 620 may contain only three key words from the log words IDF dictionary 530. Thus, the vector for log event 620, i.e., vector 640, would contain non-zero IDF values for only the three key words contained in log event 620. For example, the vector 640 could be visualized as [0 0 0.2 0.1 0 0 0 0.15 0 0 0], where the first and second words in the log words IDF dictionary 530 are not present in log event 620, and that the third word in the log words IDF dictionary 530 is present in log event 620 with an IDF value of 0.2. For storage efficiency, vector 640 may be stored as a sparse vector, for example as [(3, 1, 0.2), (4, 1, 0.1), (8, 1, 0.15)] where the first two dimensions may be a word coordinate in a word dictionary and the third number is the value.

The vector 640 further indicates, in this example, that the fourth and eighth words are present in log event 620, with respective IDF values of 0.1 and 0.15, and that the fifth, sixth, seventh, ninth, tenth, and eleventh words in the log words IDF dictionary 530 are not present in the log event 620.

FIG. 6 further shows that after vectors 640, 641 through 642 are generated that a decision may be made at 642 and 644. Decision 642 may represent that the vector, for example vector 640, represents a new vector for which the event dictionary 650 does not contain a vector with the same or similar values as vector 640, and thus may be added to event dictionary 650. However, if a vector representing a log event is the same, or similar, to an existing vector in the event dictionary 650, then decision 644 is followed where the vector is not added to the event dictionary 650, but rather an occurrence count for the same, or similar, vector within the event dictionary 650 is incremented.

Determining whether two vectors are identical or similar may include comparing the IDF values of one vector with another. If all of the values are identical then the two log events may be determined to be the same. Additionally, or alternatively, a mathematical function may be used to compare the IDF values of two vectors, for example, a cosine distance of the two compared vectors may be used to produce a value, where if that value is less than a threshold (pre-defined threshold), the two vectors may be considered to be similar enough to be treated as a single event, e.g., where the cosine distance between the vector 640 and the vector 641 is less than 0.2.

Using the data from the example in FIG. 5, the event dictionary 650 may be generated from vectors of log events 1-11 as follows. Assuming that the event dictionary 650 contains no data, vector 1 does not match any data with the event dictionary 650 and thus would be added to the event dictionary 650 with an occurrence count of 1. Log events 2-4 may be determined to not be identical or similar to any of the preceding log events in the event dictionary 650 and therefore may be added as vectors 2-4, each with an occurrence count of 1, to the event dictionary 650. However, the vector for log event 5 may be determined to be either identical or similar, with a difference less than a threshold value, to vector 1. The similarity may also be stated as if the similarity between two vectors is greater than a threshold. Therefore, rather than adding an additional vector to the event dictionary 650, vector 1's occurrence count would be incremented by 1. Thus, after all eleven log events in FIG. 5 are processed, the event dictionary 650 may contain four vectors as follows: vector 1 with an occurrence count of 5, vector 2 with an occurrence count of 2, vector 3 with an occurrence count of 2, and vector 4 with an occurrence count of 2. Thus, the event dictionary 650 may contain vectors that represent distinct log events.

Figure 7:
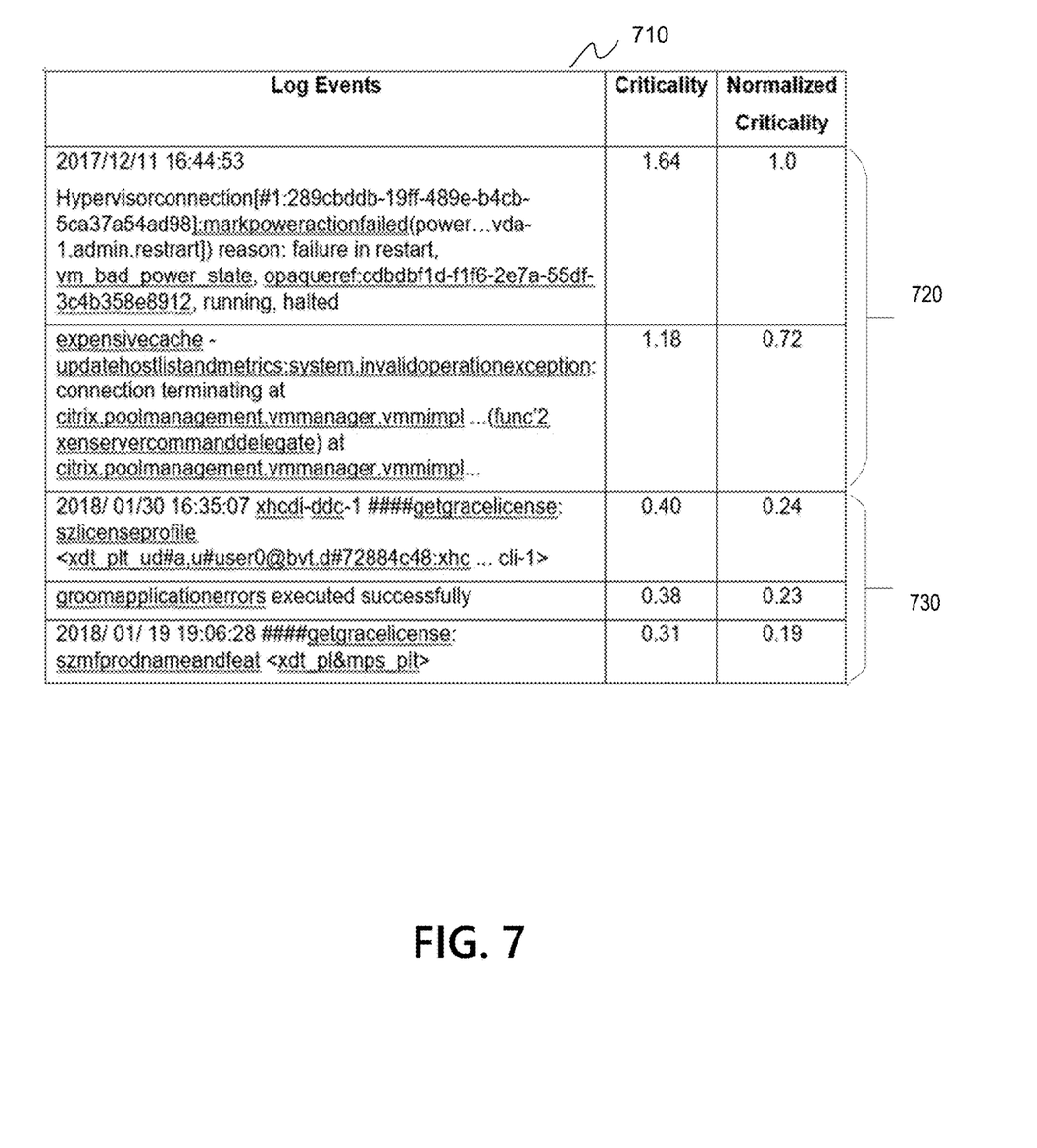
FIG. 7 depicts an illustrative example of ranked log events in accordance with one or more illustrative aspects described herein.

FIG. 7 shows a list of log events ranked by criticality. As discussed above, individual key words within a log event may be determined to have an associated IDF. In a similar manner, log events may be determined to have a criticality value, where the criticality value may be based on an inverse document frequency of the event. Thus, an event criticality value may be referred to as an event inverse document frequency.

Event criticality may be in inverse proportion to the number of instances, or occurrences, of an event. For example event criticality may be shown as the following formula:

$$\text{Crit}_i = \log((\max(\text{Occur}_j), j \in \text{Dict}(e))/\text{Occur})$$

where:

$\text{Crit}_i$=criticality value of event i max (Occur)=maximum occurrence count in the event dictionary j=index of log events contained within the event dictionary $\text{Occur}_i$=occurrence count for event i Accordingly, as event criticality is in inverse proportion to the number of instances, when an event is first recognized, its criticality is the highest. Further, as additional events are recognized by the event dictionary, all event criticality values may be adjusted. FIG. 7 shows a listing of events 710 ranked by criticality. Further, a threshold value may be ascertained by which events with criticality below the threshold value may be ignored, while those with a criticality value greater than the threshold value are prioritized or otherwise addressed before others. Thus, for example as shown in FIG. 7, if a threshold value of 1.0 is pre-defined or a normalized threshold value of 0.5, log events 720 are have criticality values greater than the threshold value while events 730 have criticality values less than the threshold value.

Event criticality may also be revised and/or updated as additional events are added into the event dictionary. Further, criticality values may also be normalized (e.g., maintaining a 0-1 value range). A normalization formula may be shown as "$\text{Crit}_i = \text{Crit}_i/(\max \text{Crit}_j, j \in \text{Dict}(e))$." An example of normalized criticality is shown in FIG. 7.

Figure 8:
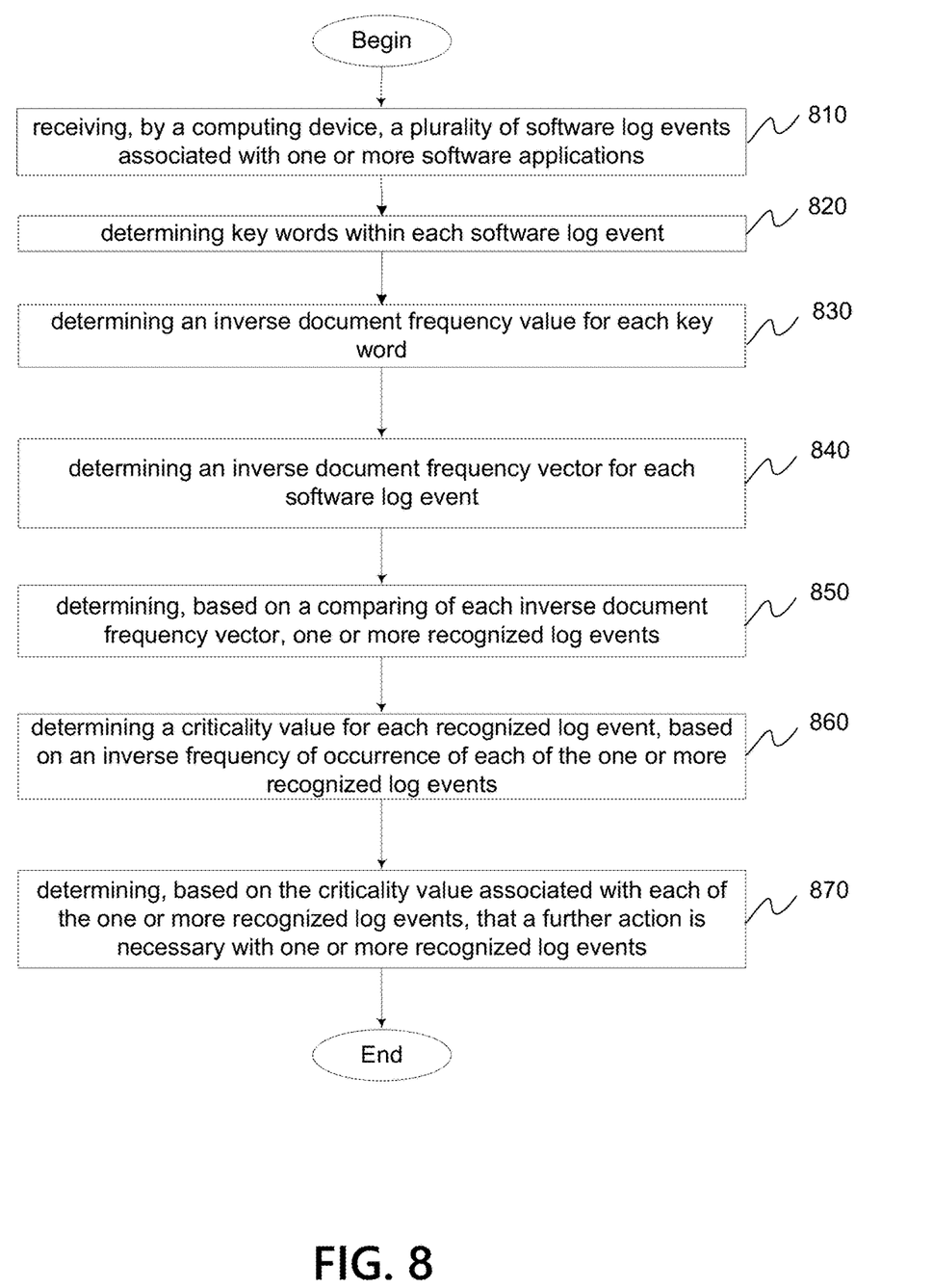
FIG. 8 depicts an illustrative flowchart of analyzing log events to produce a ranked set of recognized log events in accordance with one or more illustrative aspects described herein.

FIG. 8 depicts a flow diagram that illustrates a method 800 in which software log event files are received to determine log events (e.g., to automatically determine critical log events). Step 810 begins by receiving, by a computing device, a plurality of software log events of one or more software applications. The software log events may be contained within log files, which may contain one or more software log events. The computing device may be any type of device or resource that may be capable of executing a software application. For example, the computing environment 200, and/or the nodes 103, 105, 107, and 109. Further, the computing device may monitor its own software applications and produce the software log event files, or the computing device may receive the software log event files from another monitor program or source, such as a tracking application.

Step 820 is directed to determining key words within received software log events. The process of determining key words may include the removal of non-key words and the generation of a word dictionary containing only key words. Non-key words may include duplicate similar words and identifiers that are not related to the subject matter of a log event. The determining of key words may include the use of natural language processing such as stemming and lemmatization to consolidate key words into their stem or root components. Further, the determining of key words may also include the removal of stop word, timestamps, and file identifiers.

Step 830 is directed to determining an inverse document frequency (IDF) value for key words in the word dictionary. Generally, if a log event happens very frequently, it may be assumed that the log event is not critical. Thus, there may be an inverse relationship between the importance of a key word and the frequency of that key word in the word dictionary. As discussed above, a formula, such as "$idf_i = \log(\beta |D|/|\{j: t_i \in d_j\}|)$" may be used to determine a numerical value for individual key words. Such a determination may also be done automatically, without the need for manually reviewing log event files in an attempt to determine which words are "key" and which are not.

Step 840 is directed to determining an inverse document frequency vector for software log events. Log events may contain one or more key words. Stated in another way, individual software log events may not contain all of the key words contained within the word dictionary. In step 830, the process of determining an IDF value for key words was presented. In step 840, the IDF values may be used to determine an inverse document frequency vector of individual log events. The vector may include null values for key words that are not present in a particular log event and non-zero IDF value for key words that are present. Of note, the IDF values for key words may be automatically adjusted as new key words and/or log events are identified.

Step 850 is directed to determining, based on a comparing of inverse document frequency vectors, one or more recognized log events. Vectors may be compared to every other existing vector in an event dictionary to determine if a vector is identical or similar to another vector. As described in FIG. 7, new vectors may be compared with any existing vectors using a cosine distance, where if the cosine distance is less than a threshold amount the two vectors, and hence the two log events, are considered to be the same. When an acceptable similarity is found, rather than adding the new vector to the event dictionary, the occurrence count of the existing similar vector in the event dictionary is incremented by one. The resulting vectors within the event dictionary is identified or otherwise associated with a log event, which may also be referred to as a recognized log event, where recognized log events may represent one or more log events from a log file.

Step 860 is directed to determining a criticality value for the recognized log events. The criticality may be based on an inverse frequency of occurrence of the one or more recognized log events. As, generally, if a log event occurs frequently then it may be assumed to be a non-critical event. Thus, criticality may be based on an inverse relationship to the quantity of occurrences. Thus, a possible formula that may be used to determine criticality may be "$Crit_i = \log((\max(Occur), j \in Dict(e))/Occur)$" as discussed in regards to FIG. 7.

Step 870 is directed to a ranking of recognized log events. Specifically, a threshold value may be determined where if the calculated criticality value is above the threshold value, then a further action is necessary. The further action could be any type of remedial action, software fix, taking a server offline, or any other appropriate action. Such a ranking may also be used for a work prioritization of actions associated with recognized log events. Method 800 then ends.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, by a computing device, a log event of an application, the log event including at least one key word;
extracting the at least one key word from the log event;
determining, by the computing device, instances in which the computing device has received the log event based on the at least one key word;
determining, by the computing device, a value for the log event based on the determined instances, the value being representative of an inverse relationship between the determined instances of the log event and a criticality of the log event; and
initiating, by the computing device, an action to address an event indicated by the log event based on a comparison between the determined value and a threshold.

2. The method of claim 1, further comprising determining, for the log event, the at least one key word.

3. The method of claim 2, wherein the determining the at least one key word comprises determining an inverse document frequency value of the at least one key word.

4. The method of claim 3, wherein the determining the inverse document frequency value of the at least one key word comprises determining the inverse document frequency value based on a quantity of log events containing the key word and further based on a total quantity of log events.

5. The method of claim 1, further comprising generating a word dictionary comprising one or more key words.

6. The method of claim 5, wherein the generating the word dictionary comprises natural language processing, and wherein the natural language processing comprises stemming and lemmatization.

7. The method of claim 3, wherein the inverse document frequency value of the at least one key word comprises a total quantity of log events divided by a quantity of log events containing the at least one key word.

8. The method of claim 1, wherein the value for the log event comprises a maximum occurrence count in an event dictionary divided by an occurrence count of the log event.

9. The method of claim 5, further comprising determining an inverse document frequency vector for the log event, wherein the inverse document frequency vector comprises an inverse document frequency value for each of the one or more key words within the word dictionary.

10. The method of claim 9, wherein the inverse document frequency value for a particular key word within the word dictionary is zero where the log event fails to contain the particular key word.

11. An apparatus comprising:
one or more processors; and
memory storing instructions that, when executed by the one or more processors, cause the apparatus to:
receive a log event of an application, the log event including at least one key word;
extract the at least one key word from the log event;
determine instances in which the apparatus has received the log event based on the at least one key word; and
determine a value for the log event based on the determined instances, the value being representative of an inverse relationship between the determined instances of the log event and a criticality of the log event; and initiate an action to address an event indicated by the log event based on a comparison between the determined value and a threshold.

12. The apparatus of claim 11, wherein the instructions, when executed by the one or more processors, further cause the apparatus to determine, for the log event, the at least one key word.

13. The apparatus of claim 12, wherein the instructions, when executed by the one or more processors, cause the apparatus to determine the at least one key word by determining an inverse document frequency value of the at least one key word.

14. The apparatus of claim 13, wherein the instructions, when executed by the one or more processors, cause the apparatus to determine the inverse document frequency value of the at least one key word based on a quantity of log events containing the key word and further based on a total quantity of log events.

15. The apparatus of claim 11, wherein the instructions, when executed by the one or more processors, further cause the apparatus to generate a word dictionary comprising one or more key words.

16. The apparatus of claim 15, wherein the instructions, when executed by the one or more processors, cause the apparatus to generate the word dictionary based on natural language processing, and wherein the natural language processing comprises stemming and lemmatization.

17. The apparatus of claim 13, wherein the inverse document frequency value of the at least one key word comprises a total quantity of log events divided by a quantity of log events containing the at least one key word.

18. The apparatus of claim 11, wherein the value for the log event comprises a maximum occurrence count in an event dictionary divided by an occurrence count of the log event.

19. The apparatus of claim 15, wherein the instructions, when executed by the one or more processors, further cause the apparatus to determine an inverse document frequency vector for the log event, and wherein the inverse document frequency vector comprises an inverse document frequency value for each of the one or more key words within the word dictionary.

20. A method comprising:

determining, by a computing device, a log event from a file of an application;

extracting, by the computing device, a key word from the log event;

determining, by the computing device, a value for the extracted key word, the value being indicative of an inverse relationship between an importance of the extracted key word and a frequency of the key word in a database of key words;

comparing, by the computing device, the log event with entries of a database of log events to determine a count for the log event, the count being indicative of a quantity of occurrences of the log event within the database of log events; and determining, by the computing device, a criticality value of the log event based on the determined value and the count for the log event, wherein the criticality value enables action to be taken on the entries of the database of log events based on a level of importance.

* * * * *